United States Patent Office 3,214,204
Patented Oct. 26, 1965

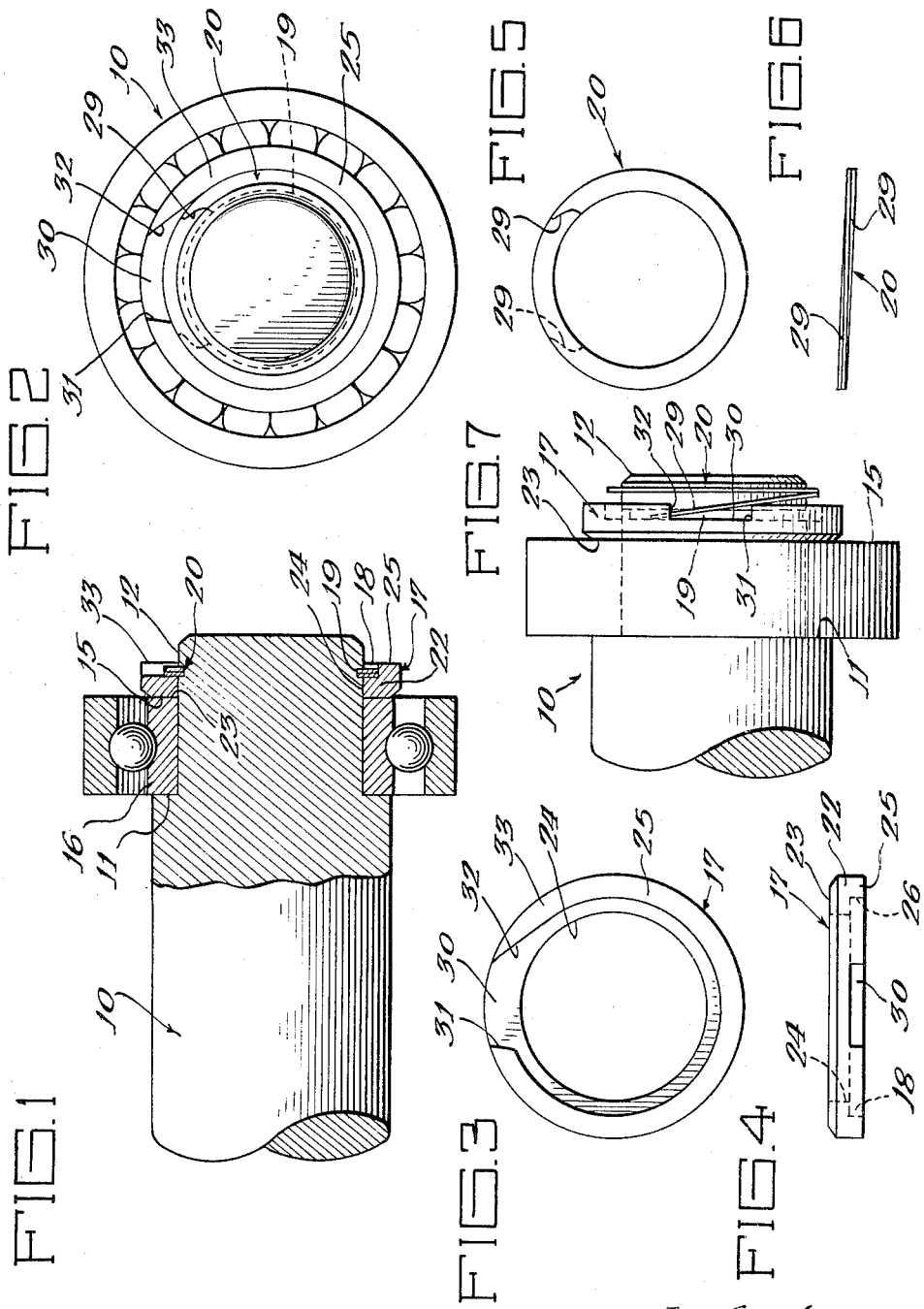

3,214,204
RETAINER ASSEMBLY
William Leroy Carter, Longmont, Colo., assignor to Sundstrand Corporation, a corporation of Illinois
Filed Oct. 2, 1961, Ser. No. 142,361
2 Claims. (Cl. 287—53)

This invention relates to a retainer assembly, and more particularly to a shaft retainer assembly, and to components thereof.

Retaining rings are commonly used in mountings between shafts and bearings, levers, or other members which detachably encircle the shaft. Such retaining rings are usually resilient, and a common example is a snap ring which is best expanded by a special tool and inserted into a circumferential groove in the shaft. Resilient retaining rings may be of various types, for example, they may be split rings with gaps between opposite ends, or a spiral of any suitable number of convolutions. Installation and removal of a retaining ring is often a tedious and time consuming procedure, particularly if suitable special tools for handling the ring are not available. Another difficulty often encountered in the use of resilient retaining rings is that the ring may expand outwardly and become disengaged from the shaft groove. Thus, retaining rings which are readily available are not entirely reliable and are often difficult to install and remove.

It is, therefore, a primary object of this invention to provide a new and improved retainer assembly.

Another object is to provide a new and improved retainer assembly having a retaining ring and provision for installing the ring in a shaft groove and removing the ring from the groove. A related object is provision in such an assembly for releasably holding the ring in the groove.

Still another object is provision of a new and improved retainer assembly for threading a retaining ring into and out of a circumferential groove in a shaft.

A further object is provision of a new and improved retainer assembly having a retainer for releasably holding a resilient retaining ring on a shaft.

Additional objects and advantages of the invention will be readily apparent from the following description and drawings, in which:

FIGURE 1 is a fragmentary longitudinal view of a preferred embodiment of a retainer assembly, with parts broken away for clearer illustration;

FIGURE 2 is an end view of the retainer assembly of FIGURE 1;

FIGURE 3 is an end view of a retainer removed from the retainer assembly;

FIGURE 4 is a top view of the retainer of FIGURE 3;

FIGURE 5 is an end view of a retaining ring removed from the retainer assembly;

FIGURE 6 is a top view of the retaining ring of FIGURE 5; and,

FIGURE 7 is a view of the retainer assembly during installation of the ring on a shaft.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

The invention is, in brief, directed to a retainer assembly in which a shaft has a circumferential groove receiving a retaining ring. A retainer is telescopically received on the shaft between the ring and an abutment extending outwardly from the shaft and has a circumferential flange encircling the ring to limit outward expansion of the ring and its possible disengagement from the shaft groove. The retainer further serves as a washer between the retaining ring and the abutment. A radially extending gap in the retainer flange receives the retaining ring during installation and removal thereof and facilitates spirally threading the ring into and out of the shaft groove.

With particular reference to FIGURES 1 and 2 of the drawings, a preferred embodiment of the retainer assembly is illustrated. A shaft 10 has a radial shoulder 11 extending between the shaft side and a reduced end portion 12 of the shaft. A suitable abutment 15 extends radially outwardly from the shaft, and as illustrated herein this abutment is provided by an annular side of an inner race 16 of a ball bearing assembly telescoped on shaft end 12 and seated against shaft shoulder 11. Abutment 15 could equally well be provided by any member mounted on shaft end 12, or by a part of the shaft, as shoulder 11. A retainer 17 is freely telescoped on shaft end 12 and against abutment 15. An undercut portion 18 of the retainer faces outwardly toward the end of the shaft and overlies a groove 19 in a cylindrical side of the shaft and a retaining ring 20 received in the groove.

With particular reference to FIGURES 1, 3 and 4, retainer 17 has an annular body 22 with an inner annular face 23 adjacent abutment 15, and a cylindrical inner surface 24 which is slidably telescoped on shaft end 12. Undercut 18 is defined by an annular flange 25 extending axially outwardly from body 22. This flange has an inner cylindrical surface 26. When the retainer assembly is installed on shaft end 12, surface 26 engages the outer periphery of the retaining ring 20 and is spaced radially outwardly from the shaft end a distance less than the radial width of retaining ring 20 for effectively preventing outward expansion of the ring and releasably retaining the ring in shaft groove 19.

As shown in FIGURES 5–7, retaining ring 20 is illustrated in a preferred embodiment in the form of a resilient spiral ring having slightly less than two complete convolutions. This ring is normally in the condition shown in FIGURES 1 and 6 with annular faces of the convolutions abutting, and is illustrated in FIGURE 7 in an axially expanded condition while being spirally threaded into the groove.

With particular reference to FIGURE 7, to install the retainer assembly, a ball bearing, or other member providing abutment 15, is telescoped onto shaft end 12 and against shaft shoulder 11. Retainer 17 is then telescoped onto shaft end 12 with its annular face 23 adjacent the abutment 15. The normal inside diameter of retaining ring 20 is preferably about equal to the diameter of the base of groove 19. The ring is slightly radially expanded and installed on shaft end 12. A free end 29 of retaining ring 20 is then flexed outwardly from the adjacent convolution and is inserted through a gap 30 in retainer flange 25 and into groove 19. As illustrated, this gap is defined by opposite ends 31 and 32 of the flange and extends radially outwardly from adjacent shaft groove 19. Flange end 32 is defined by a surface generally tangential to inner cylindrical surface 26 of the flange for engaging and guiding ring end 29 into the shaft groove. With ring end 29 received in shaft groove 19 and under flange end 32, the retainer is rotated counterclockwise, as viewed in FIGURE 2, and the retainer flange end 32 and flange side 26 moves progressively over the outer periphery of the convolutions of retaining ring 20 to spirally thread the retaining ring into the shaft groove. After the retaining ring is fully seated within the shaft groove the retainer flange 25, and more particularly the inner cylindrical surface 26 of this flange, effectively prevents radial expansion of the retaining ring and releasably holds the ring in the shaft groove. Thus the ring may be easily installed in the shaft groove without the use of special tools, and the retainer further facilitates installation of the ring when a snug axial fit is desired between the retainer and the ring.

To facilitate removal of the retaining ring 20 from shaft groove 19 the outer free end 29 of the retaining ring is positioned adjacent retainer gap 30 and is flexed radially outwardly from the shaft groove 20 and positioned against an outer annular face 33 of retainer flange 25 adjacent flange end 31. Retainer 25 is then rotated clockwise, as viewed in FIGURE 2, to spirally thread the remainder of retaining ring 20 out of the shaft groove. To facilitate flexing of the ring end out of the shaft groove, the ends have undercut bevels for receiving a probe, such as a pick or screw driver.

I claim:

1. A retainer for installing and removing a retaining ring in a shaft groove, comprising: an annular body having an inner cylindrical surface adapted to be telescopically received on the shaft; and an annular flange extending axially outwardly from said body and having an inner cylindrical surface spaced radially outwardly from the cylindrical body surface for overlying the ring and retaining the ring in the groove, and said flange having circumferentially spaced ends defining an axially open gap therebetween which is axially coextensive with said flange and which is adapted to receive said ring during installation and removal, at least one of said ends having a surface tangential to the flange inner cylindrical surface.

2. A retainer for installing and removing a retaining ring in a shaft groove, comprising: an annular body having an inner cylindrical surface adapted to be telescopically received on the shaft; and an annular flange extending axially outwardly from said body and having an inner cylindrical surface spaced radially outwardly from the cylindrical body surface for overlying the ring and retaining the ring in the groove, and said flange having circumferentially spaced ends defining an axially open gap therebetween which is axially coextensive with said flange and which is adapted to receive said ring during installation and removal, at least one of said ends having a surface generally tangential to the flange inner cylindrical surface.

References Cited by the Examiner

UNITED STATES PATENTS

| 714,611 | 11/02 | Riebe. | |
|---|---|---|---|
| 1,464,386 | 8/23 | Ingram | 287—135 X |
| 2,450,425 | 10/48 | Frisby | 85—8.8 |
| 2,760,258 | 8/56 | Rieger | 287—135 X |
| 2,897,022 | 7/59 | Marola. | |
| 2,955,853 | 10/60 | Bendicsen | 287—53 X |
| 3,080,771 | 3/63 | Baldwin | 85—8.8 X |

FOREIGN PATENTS 565,098   10/32   Germany.

OTHER REFERENCES

Product Engineering, pp. 454–455, December 1933.

CARL W. TOMLIN, *Primary Examiner.*

WALTER A. SCHEEL, *Examiner.*